Figure 1:
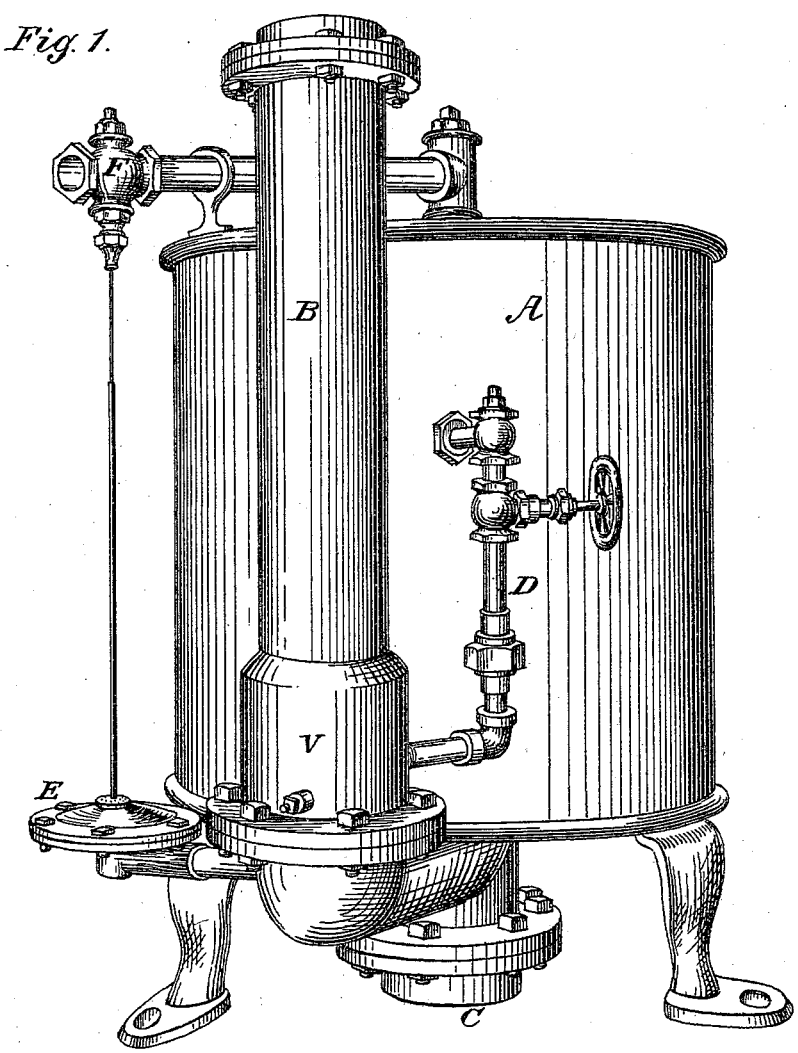

2 Sheets--Sheet 1.

W. E. PRALL.

Improvement in Steam Vacuum Pump.

No. 123,292.                  Patented Jan. 30, 1872.

Witnesses:
Fredk Artos
Mo. D. de Pres

Inventor:
W E Prall

2 Sheets--Sheet 2.
W. E. PRALL.
Improvement in Steam Vacuum Pump.
No. 123,292. Patented Jan. 30, 1872.
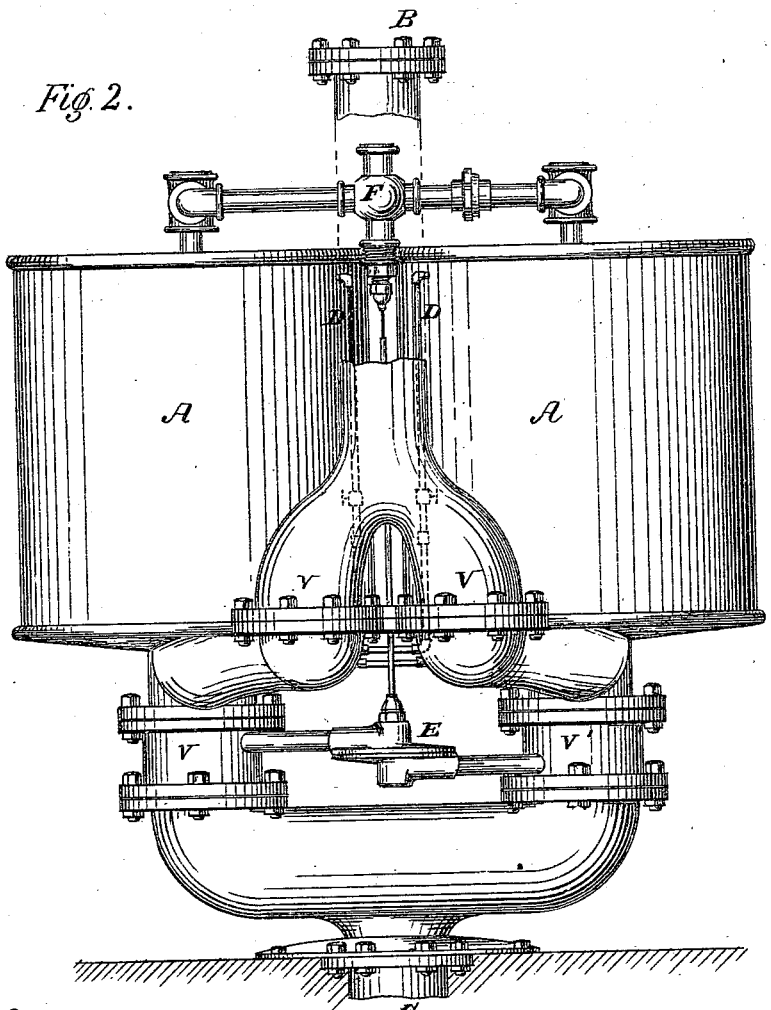
Fig. 2.
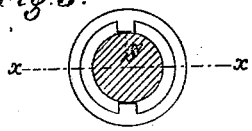
Fig. 3.
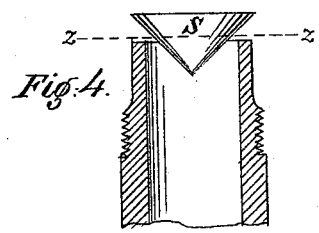
Fig. 4.
Scale for Fig. 1.
Witnesses:
Inventor:
W. E. Prall 123,292

UNITED STATES PATENT OFFICE.

WILLIAM E. PRALL, OF WASHINGTON, DISTRICT OF COLUMBIA.

IMPROVEMENT IN STEAM VACUUM-PUMPS.

Specification forming part of Letters Patent No. 123,292, dated January 30, 1872.

SPECIFICATION.
Specification describing certain Improvements in Steam-Pumps, invented by WILLIAM E. PRALL, of Washington, District of Columbia.

This invention relates to the mechanism employed to produce an automatic steam-pump, and is intended as an improvement on the various patents granted to me for that purpose. The arrangement and operation of the machine are very much the same in principle as the others above referred to.

In Figures 1 and 2 are shown two different methods of construction, which vary a little in detail only, the principle being the same.

Fig. 1, A is a cylinder; B, a discharge-pipe; C, a suction-pipe; and D, an injection-pipe, provided with a check-valve, opening upward. This connects the discharge-pipe above the valve V with the cylinder near the top. The suction-pipe C is also provided with a valve. E is a diaphragm, connecting with the cylinder or some other part of the pump at a point where the force of the steam within the device can be exerted to force it outward, and when the force of the vacuum will force it inward or in the opposite direction; or this diaphragm may be placed so as to connect between the two cylinders, as shown in Fig. 2, in which steam is used to force water, and afterward condensed for the purpose of refilling by the force of the vacuum. When the steam has expelled the water from the cylinder a portion of it will pass into the discharge-pipe and come in contact with the valve. The descending water from the valve will cause a partial vacuum, or, rather, will lessen the pressure within the cylinder. The effect of this reduction of pressure in the pump, if the diaphragm is connected with it on one side only and the other side is in contact with the atmosphere, as shown in Fig. 1, will be, when the pressure is reduced below the atmospheric pressure, to draw it inward; but when the diaphragm is used in the double-acting or pump of two cylinders, as shown in Fig. 2, if the throttle or cut-off valve F is allowed to leak steam a very little, which could not easily be prevented in any case, the pressure would be nearly equal on both sides of the diaphragm, being connected on one side with one cylinder and on the other side to the other cylinder, and, when so arranged, it would operate the throttle or cut-off valve as soon as the pressure is reduced a very little below that in the opposite cylinder to the one discharged. It will be seen that the diaphragm in either case forms a part of the steam-cylinder or other portion of the pump which receives the pressure, and has the same pressure exerted against it that any other part resists, but is susceptible of a movement in opposite directions, which it receives from the expansion and contraction force within the pump or pumps. The small amount of steam that leaks through tle or cut-off valve acts to force the diaphragm outward, which opens the valve full and lets on the full force of the steam; or the cut-off valve may be so arranged that the force of the steam will open it by the increased pressure in one direction as soon as the water has filled the cylinder and the diaphragm is relieved from the vacuum force. As soon as the pressure is reduced in the cylinder, by the condensation of the steam which is brought in contact with the valve of the discharge-pipe, said valve will close and water will be injected from the injection-pipe into the cylinder, which will complete the condensation and cause the cylinder to refill with water. By connecting the diaphragm on both sides, as shown in Fig. 2, the action of the throttle or cut-off valve is quicker than when used with one cylinder, and the reduction of the pressure in the discharge-cylinder need not be so great as in the other case to cause its movement on account of the pressure on the opposite side being greater than the atmospheric pressure.

The action of the double pump above described differs from the one described in my former application for a patent principally in the manner of reducing the pressure on one side of the diaphragm to cause the movement of the throttle or cut-off valve, the result and mechanism being the same in each case.

When two cylinders are used the injection-pipe extends from the bottom of each to the top of the other, and provided with valves opening upward, so that water will be forced from the discharging-cylinder into the one refilling.

The nozzle of the injection-pipe is so arranged as to prevent its being filled up by fibrous or other matter by being constructed so as to distribute the water without having perforations. This is accomplished by placing a small conical distributing-plate, S, as shown in Figs. 3 and 4, in front of the injection, the small end projecting inward in such manner as to throw the water in a thin sheet over the surface of the cone. In all cases where the diaphragm is used as above described a piston could be used, but not so advantageously.

I reserve the right to claim, in another application, the diaphragm E, operated by the intermittent weight of one or more water columns, for the purpose set forth and for other purposes.

Having thus described my invention, what I claim, and desire to secure by Letters Patent, is—

The combination of pipe D and nozzle with conical distributing-plate S, cylinder A, and pipe B, as shown and described.

W. E. PRALL.

Witnesses:
   JNO. D. DEFREES,
   EDM. F. BROWN.